June 13, 1961 S. WOODS ET AL 2,988,300
SPOOL-CARRIER
Filed Aug. 13, 1958 3 Sheets-Sheet 3
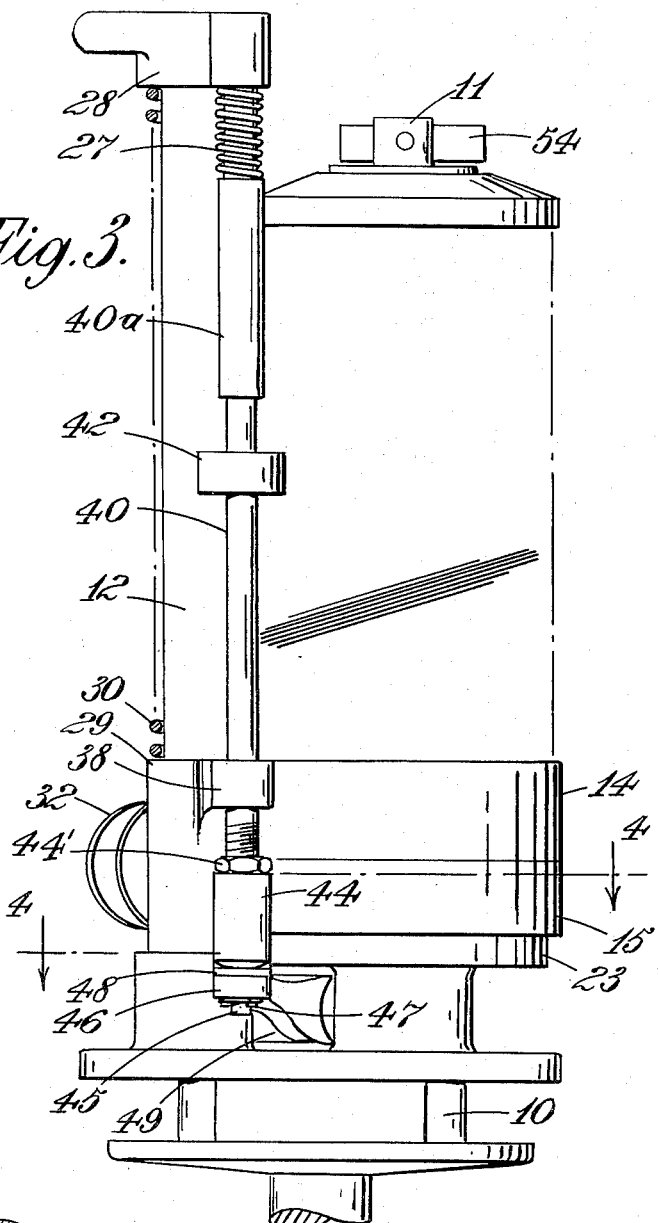
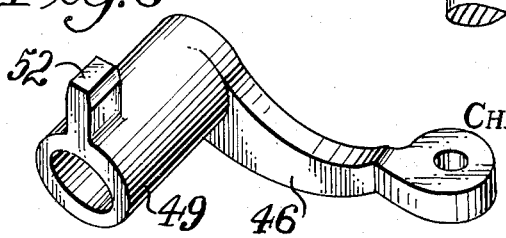
INVENTORS
STANLEY WOODS
CHARLES EDWARD GORDON TURNER
BY
ATTY.

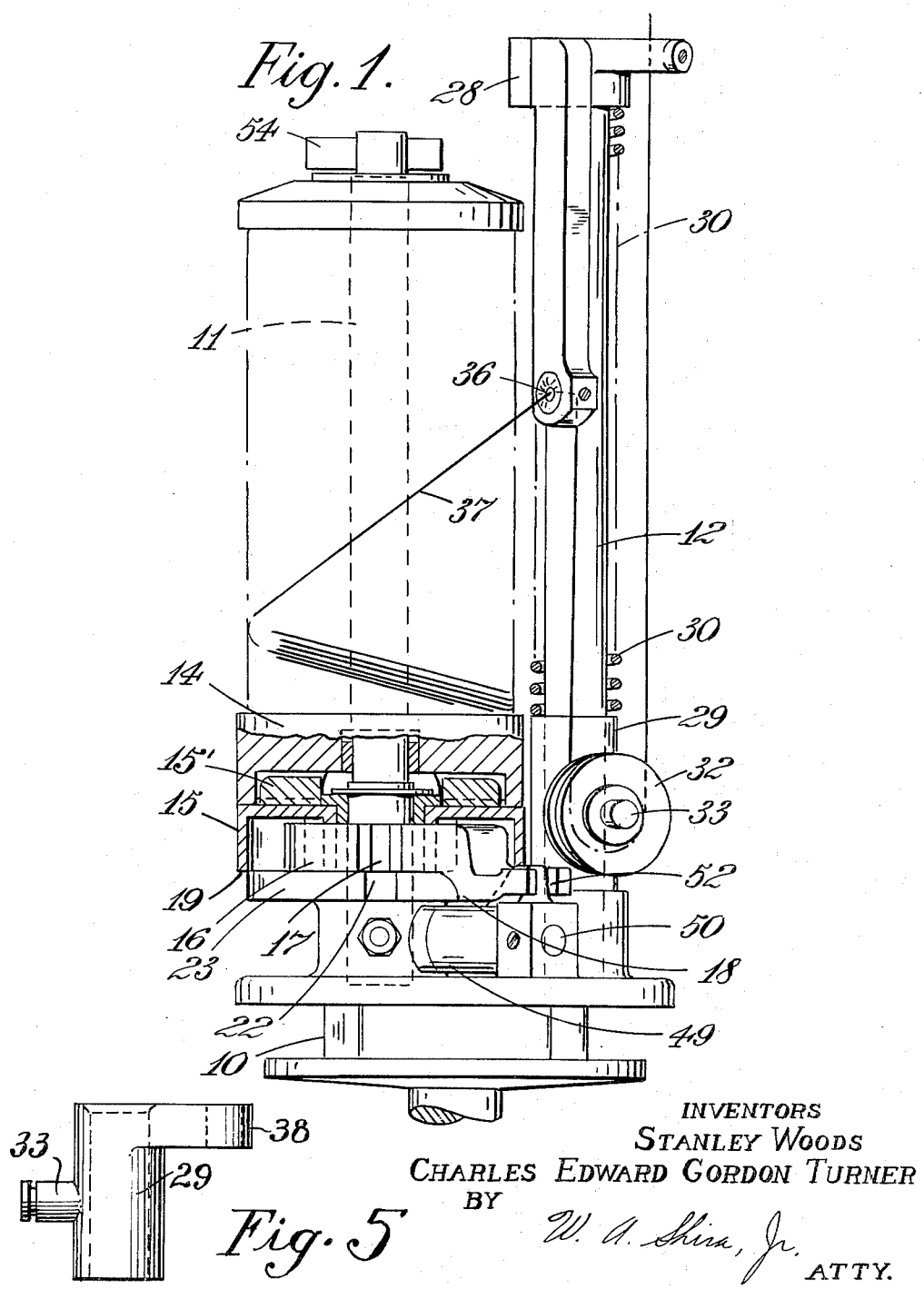

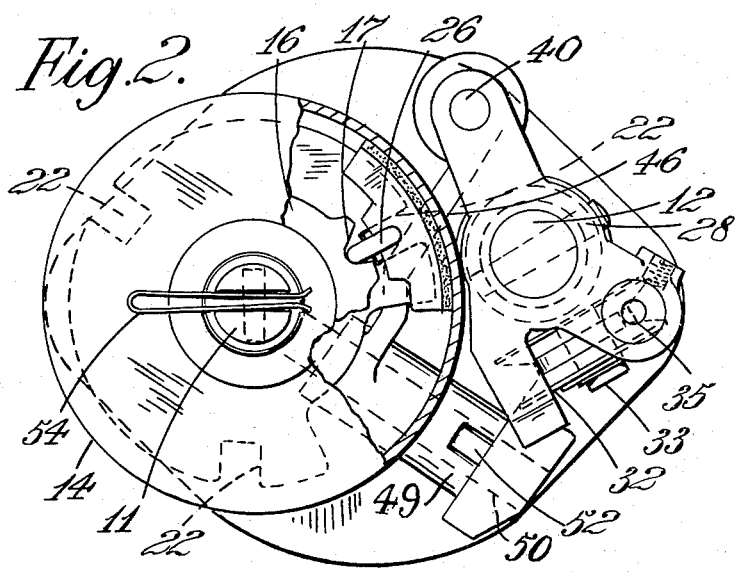
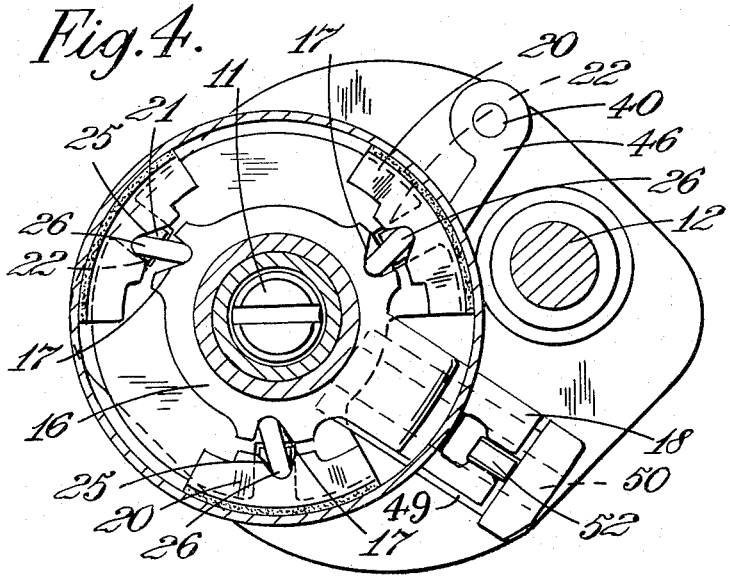

2,988,300
SPOOL-CARRIER
Stanley Woods and Charles Edward Gordon Turner, Leyland, near Preston, England, assignors to BTR Industries Limited (formerly British Tyre & Rubber Company Limited), London, England, a British company
Filed Aug. 13, 1958, Ser. No. 754,796
Claims priority, application Great Britain Aug. 14, 1957
6 Claims. (Cl. 242—156.2)

The invention relates to spool carriers as used, for example, in braiding machines, cabling machines, wire covering machines and the like. The invention is concerned with spool carriers of the kind embodying support means for a rotatable flanged spool of a tensile element such as wire, cord, threads or the like, a brake for maintaining tension on the wire or the like as it is unwound from the spool by retarding unwinding rotation of the spool and means responsive to increase in tension of the wire to release the brake, at least in part.

In such carriers as at present constructed the brake acts directly on the spool either frictionally or positively. In the case of a friction brake this has the disadvantage that changing spools to replenish the supply of wire may result in change in the tension due to the fact that, because of brake wear, the spools are of different sizes with consequential variations in the brake pressure. In the case of a positive brake the shock loads on engagement and disengagement of the brake are heavy and result in undue wear and breakage of the parts and possibly breakage of the wire.

According to the present invention a spool carrier of the above kind is characterised in that the support means comprise a rotatable element with a disconnectable driving connection between the spool and the element whereby the spool effects rotation of the element as the wire or the like is unwound and the brake acts upon the rotatable element of the support means.

In a preferred construction according to the invention the brake comprises a friction drum constituting, or rotatable with, the rotatable element, at least one (e.g. three) floating shoe for engagement with the drum, means for guiding the shoe for movement in a radial direction, a brake-applying member supported for partial rotation around the axis of the drum and a sprag acting between the shoe and the applying member and arranged on rotation of the applying member in one direction to push with a toggle action the shoe against the drum. There may be a spring acting, directly or indirectly, on the applying member to effect rotation thereof in said one direction and thereby to apply the brake.

The tension responsive means for releasing the brake may comprise a slide movable along a guide, spring means urging the slide in one direction along the guide, a pulley on the slide, means for guiding the wire or the like in a loop around the pulley such that the tension in the wire acting on the pulley will tend to move the slide against the spring and means operable by the slide when it reaches a predetermined position along the guide under the action of the wire tension, to release the brake. The slide operated means may, for example, comprise an abutment engageable and movable by the slide when it reaches the position aforesaid and means for translating the movement of the abutment into brake releasing action (e.g. by rotation of the applying member aforesaid against the applying spring). Conveniently the guide is parallel to the spool axis and it is preferably constructed as a solid bar or rod with the slide fitting around it.

The spool may be carried on a pillar which also carries the brake drum and there may be an eccentric peg and socket engagement between the drum and a flange of the spool to constitute the driving connection between the spool and the drum.

A specific construction of a spool carrier according to the invention will now be described by way of example and with reference to the accompanying drawings in which:

FIGURE 1 is a front view, partly in section, of the carrier with a spool in place,
FIGURE 2 is a plan view of the carrier and spool, partly broken away,
FIGURE 3 is a rear view of the carrier and spool,
FIGURE 4 is a section on the line 4—4 in FIGURE 3,
FIG. 5 is a detached side elevational view of the brake actuating slide member, and
FIG. 6 is a detached perspective view of the brake actuating lever.

The carrier forming the subject of this example is intended for use in a braiding machine used in making wire-braided hose. The carrier has a base 10 for mounting in the guide slots of the machine face-plate in well-known fashion. Upstanding from the base (i.e. to be perpendicular to the face-plate) there are two parallel fixed pillars, 11, 12. The pillar 11 carries the flanged spool 14 for rotation thereon and between the spool and the base there is a brake drum 15 rotatable on the pillar, the mouth of the drum facing downwardly towards the base away from the spool. Upstanding from the back of the drum there are four eccentric pegs or projections 15' which engage in recesses in the adjacent spool flange to constitute a driving connection between the drum and the spool.

Rotatable on the pillar 11 within the drum 15 there is a brake-applying member 16 which has three equally spaced notches 17 in its circumference and a forked arm 18 which extends outwardly beneath the rim 19 of the drum. Around the member 16 and between the member and the inside of the drum there are three equally spaced lined brake shoes 20 which are guided for radial movement by pegs 21 on their under faces fitting in slots 22 in a fixed back plate 23. Each shoe has a notch 25 in its near face, the notch being slightly in front, in the brake applying direction of rotation of the applying member, of one of the notches 17 in the applying member. Extending between these two notches there is, for each shoe, a sprag or thrust member constituted by a short loose bar 26 of which the ends are received in the notches. The arrangement is that partial rotation (counter-clockwise as seen in FIGURE 4) of the applying member 16 causes the sprags to force the shoes outwardly with a toggle action against the drum. A spring 27 acts, as later described, to effect such rotation of the member, the force of the spring being adjustable.

The second pillar, 12, is in the form of a round section rod with a cap 28 on its free end. Slidable along the pillar there is a slide 29 which is urged by a spring 30 around the pillar towards the base. The slide carries a pulley 32 on a stub-shaft 33 perpendicular to the pillar. The cap carries two eyes 35, 36 for the wire 37 which, in use is taken from the spool, through the eye 36 downwardly around the pulley 32 and then upwardly through the eye 35 so that the wire forms a loop around the pulley 32 and the tension in the wire tends to move the slide 29 upwardly against the spring 30.

A rod 40 is guided for axial sliding movement parallel with the pillars 11 and 12 by aligned bores in the cap 28 and in an arm 38 which projects from the slide 29 on the side thereof opposite the stub-shaft 33 for the pulley 32, see FIGS. 3 and 5. The rod 40 has an enlargement 40a near the cap and the spring 27 which surrounds the rod acts between the cap and the enlargement to urge the rod towards the base. The rod also carries a collar 42 which is adjustable along the rod. When the slide 29 has been lifted a substantial distance by the tension on the wire the guide arm 38 contacts the collar 42 on the rod and further movement of the slide carries the rod with it. Screwed onto the lower end of the rod 40, beneath the arm 38, there is an extension member 44 terminating in a portion 45 of small diameter. The member 44 may be adjusted along the rod and locked by a nut 44', this adjustment varying the loading of spring 27. The portion 45 passes, with clearance, through a hole in one arm, 46, of a bellcrank lever. A snap ring 47 holds the arm in place and there is a resilient washer 48 above the arm.

The inner end of lever arm 46 is integrally united with a cylindrical body portion 49 of the bellcrank lever, see FIG. 6, which is pivoted on a rod 50 secured to the base of the apparatus. The other arm 52 of the lever is an integral projection from the body portion 49 and this arm extends upwardly between the arms of the fork 18 so that rocking movements of the bellcrank derived from up and down movements of rod 40 effect partial rotation of the brake-applying member 16 and so cause release and engagement of the brake, the engagement being effected by the downward force of spring 27. Accordingly, in use, the brake is held on by the spring 27 until the tension in the wire is sufficient to bring the slide arm 38 into engagement with the collar 42 on the rod 40 when further increase in tension will gradually release the brake.

A simple clip 54 is provided for holding the spool on its pillar and to remove a spool for changing it is only necessary to release the clip and to slide the spool off its pillar.

It is an advantage of the construction above described, in addition to the advantage that changing spools does not vary the wire tension, that spools of a very simple construction may be used and there is no brake wear on the spools.

It is undesirable that the brake should be completely released in use, to avoid over-run of the spool and means may be provided for preventing this. In a simple arrangement the applying member is a loose fit on the pillar and even when rotated to release the brake the reaction of the release means tends to move the member radially to apply a direct radial pressure onto one of the three shoes.

The invention is not restricted to the constructional details of the above example. For instance in the construction as shown, the arm 52 has parallel sides as also have the arms of the fork 18, and sufficient clearance is provided in the fork to allow for the changes in angularity of the arm 52. If desired however the arm 52 and the arms of the fork may be constructed as teeth of bevel gears, the teeth as is usual in such gears radiating from the inter-section of the two axes of rotation. In some applications of the carrier there may be a tendency for oil, used for lubricating other parts, to find its way into the brake. For use in such applications oil seals preventing entry of oil to the brake drum may be provided.

We claim:

1. A spool carrier of the type described comprising a rotatable support for a removable spool having an elongated tensile element wound thereon, brake means cooperating with said support to control rotation thereof in response to withdrawal of the said element from the spool including an annular surface on said support and brake shoe means radially movable to and from engagement with said support, a brake applying member supported for partial rotation about the axis of said support, a lever operatively interconnected to said brake applying member to effect partial rotation of the latter in response to rocking movement of the lever, means operatively interconnecting said brake-applying member to said shoe means effective for converting said partial rotating movement to radial movement of the said shoe means, means including a spring acting on said lever to normally effect movement thereof in the direction causing engagement of the shoe means with said annular surface, and means responsive to tension on said element in excess of a predetermined minimum as the element is removed from said support to move said lever in brake-releasing direction against the force of said spring.

2. A spool carrier of the type described comprising a rotatable support for a removable spool having an elongated tensile element wound thereon and which is to be withdrawn therefrom, an annular brake surface on said support, brake shoe means mounted for radial movement to and from engagement with said annular surface, a brake-applying member supported for partial rotation about the axis of said support, a sprag between said brake shoe means and said applying member operative in one direction of rotation of said member to move said shoe means against said annular surface, a pivoted lever including a pair of arms with one arm thereof operatively interconnected with said brake-applying member to effect partial rotation thereof upon rocking movement of the lever, spring means acting on the other arm of said lever to normally rock said lever in a brake-engaging direction, guide means for said tensile element as it moves from said spool including a member mounted for movement relative to said support in response to changes of tension in said element, and means carried by said last-mentioned member engageable with said spring means upon increase of tension in said element in excess of a predetermined minimum thereby moving said lever in the brake-releasing direction.

3. A spool carrier as defined in claim 2 wherein said support and spool have cooperating interfitting surfaces providing a releasable positive driving connection therebetween.

4. A spool carrier of the type described comprising a rotatable support for a removable spool having an elongated tensile element wound thereon and which is to be withdrawn therefrom, an annular brake surface on said support, brake shoe means mounted for radial movement to and from engagement with said annular surface, a brake-applying member supported for partial rotation about the axis of said support, a thrust member having the ends thereof received in recesses in said brake shoe means and said brake applying member respectively and operative in one direction of rotation of said member to move said shoe means against said annular surface, a pivoted lever including a pair of arms with one arm thereof operatively interconnected with said brake-applying member to effect partial rotation thereof upon rocking movement of the lever, means including a spring acting on the other arm of said lever to normally rock said lever in a brake-engaging direction, guide means for said tensile element as it moves from said spool including a member mounted for movement relative to said support in response to changes of tension in said element, and means carried by said last-mentioned member engageable with said lever-rocking means upon increase of tension in said element in excess of a predetermined minimum to thereby rock said lever in the brake-releasing direction.

5. A spool carrier of the type described comprising a rotatable support, means for removably and coaxially positioning on said support a spool having an elongated tensile element wound thereon and which is to be withdrawn therefrom, a releasable driving connection between said support and spool, an annular brake surface on said support, brake shoe means mounted for radial movement to and from engagement with said annular surface, a brake-applying member supported for partial rotation about the axis of said support, a thrust member between said brake shoe means and said applying member operative in one direction of rotation of said member to move said shoe means against said annular surface, a pivoted lever including a pair of arms with one arm thereof operatively interconnected with said brake-applying member to effect partial rotation thereof upon rocking movement of the lever, a member supported for sliding movement parallel to the axis of rotation of said support and connected to the other arm of said lever to rock said lever, a spring acting on said sliding member to normally rock said lever in a brake-engaging direction, guide means for said tensile element as it moves from said spool including a member mounted for movement relative to said support in response to changes of tension in said element, and means carried by said last-mentioned member engageable with said sliding member upon increase of tension in said element in excess of a predetermined minimum to move the said sliding member against the action of said spring thereby rocking said lever in the brake-releasing direction.

6. A spool carrier as defined in claim 5 wherein said sliding member has a collar adjustably mounted thereon with which the said means on the tension-responsive member engages to effect movement of said sliding member thereby permitting adjustment of brake release for element tensions in excess of different predetermined minimum values.

References Cited in the file of this patent

UNITED STATES PATENTS

| | | |
|---|---|---|
| 1,152,316 | Hatton | Aug. 31, 1915 |
| 1,182,679 | Hatton | May 9, 1916 |
| 1,743,501 | Swortzel | Jan. 14, 1930 |
| 2,127,936 | Pierce | Aug. 23, 1938 |